(12) United States Patent
Shoji et al.

(10) Patent No.: US 6,614,735 B2  
(45) Date of Patent: Sep. 2, 2003

(54) METHOD AND APPARATUS FOR DETERMINING OPTICAL RECORDING POWER USED FOR RECORDING ONTO AN OPTICAL DISK

(75) Inventors: Mamoru Shoji, Osaka (JP); Ariaki Ito, Nara (JP); Takashi Ishida, Kyoto (JP); Yukihiro Yamasaki, Osaka (JP); Toshiya Akagi, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/814,073

(22) Filed: Mar. 22, 2001

(65) Prior Publication Data

US 2001/0026516 A1 Oct. 4, 2001

(30) Foreign Application Priority Data

Mar. 23, 2000 (JP) ........................................ 2000-081204

(51) Int. Cl.$^7$ .............................................. G11B 7/125
(52) U.S. Cl. ...................................... 369/47.53; 369/116
(58) Field of Search ............................... 369/116, 47.53

(56) References Cited

U.S. PATENT DOCUMENTS

| | | | | |
|---|---|---|---|---|
| 5,070,495 A | * | 12/1991 | Bletsche, Jr. et al. ....... | 369/116 |
| 5,790,491 A | * | 8/1998 | Jaquette et al. .......... | 369/116 X |
| 5,831,943 A | * | 11/1998 | Kurita et al. ............ | 369/116 X |
| 5,872,763 A | * | 2/1999 | Osakabe ..................... | 369/116 |
| 5,898,655 A | * | 4/1999 | Takahashi ................ | 369/116 X |
| 5,936,924 A | * | 8/1999 | Tanaka .................... | 369/116 X |
| 5,970,026 A | * | 10/1999 | Wachi et al. ............. | 369/13.22 |
| 6,061,316 A | * | 5/2000 | Nakamura et al. ......  | 369/116 X |
| 6,269,062 B1 | * | 7/2001 | Minemura et al. ........ | 369/47.53 |
| 6,434,106 B1 | * | 8/2002 | Ohtsuka ..................... | 369/116 |

FOREIGN PATENT DOCUMENTS

| | | |
|---|---|---|
| EP | 0883113 A2 | 12/1998 |
| JP | 11-66698 | 3/1999 |

\* cited by examiner

*Primary Examiner*—Aristotelis M. Psitos  
(74) *Attorney, Agent, or Firm*—Wenderoth, Lind & Ponack, L.L.P.

(57) ABSTRACT

The invention provides an optical disc device and a method of determining an optimal laser power for data recording by trial recording before recording actual user data even when there are fingerprints in the test track area for the trial recording. The BER (Byte Error Rate) is detected in each recorded sector. If the BER is less than a particular threshold value, the sector is taken as OK (good). Otherwise the sector is taken as NG (no good). While the peak power level is gradually changed or decreased from the power level at which half or more of the plural reproduced sectors are OK, a boundary peak power at which half or more of the sectors become NG is found. Based on the found boundary power, an amount of the optimal peak power is determined.

18 Claims, 10 Drawing Sheets

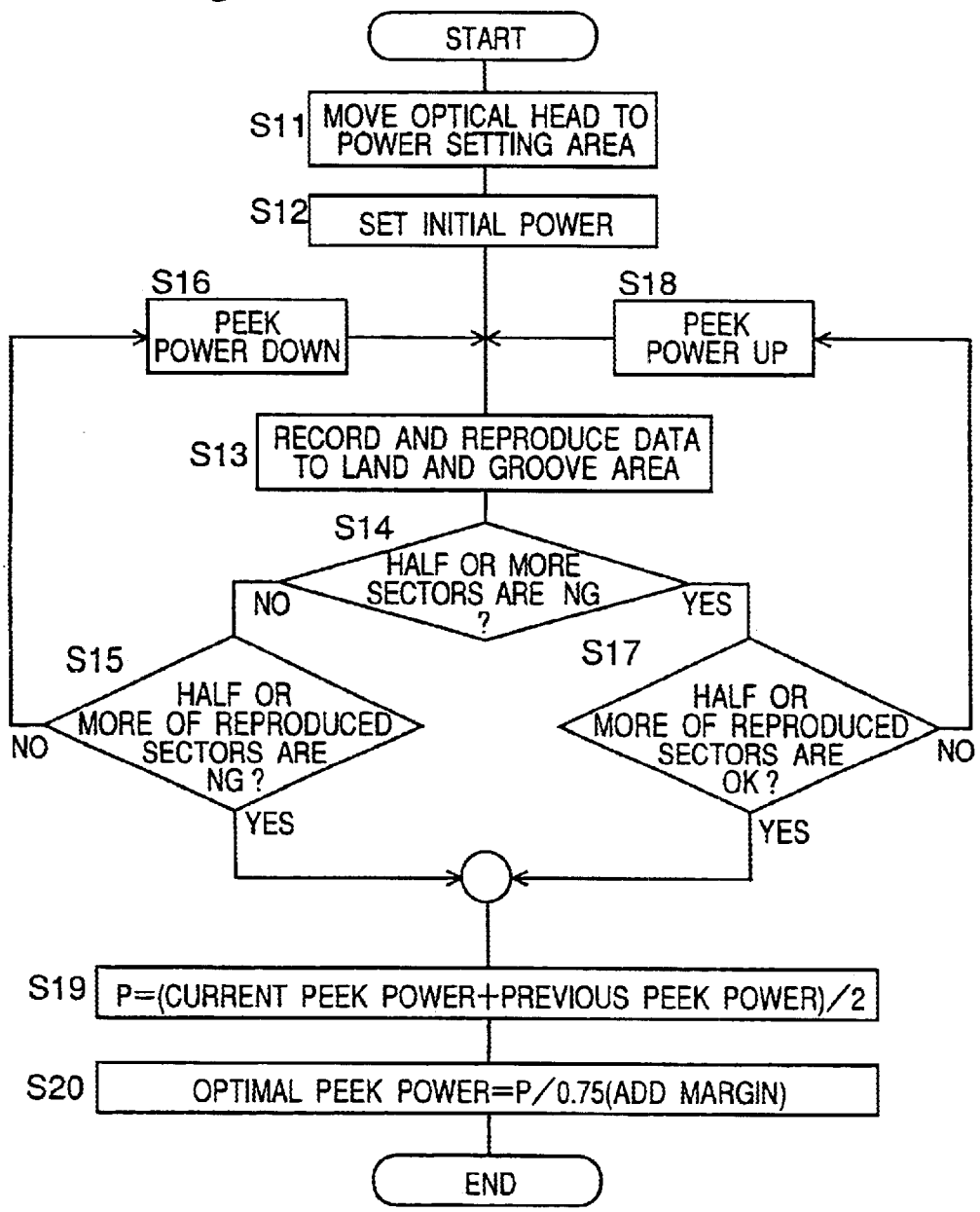

Fig.5A

| POWER | SECTOR0 | SECTOR1 | SECTOR2 | SECTOR3 | SECTOR4 | SECTOR5 | SECTOR6 | SECTOR7 | ERROR COUNT ERROR COUNT THRESHOLD 80 | NG SECTOR COUNT ERROR COUNT THRESHOLD 10 SECTOR COUNT THRESHOLD 4 |
|---|---|---|---|---|---|---|---|---|---|---|
| P0 | 0 | 0 | 0 | 0 | 0 | 0 | 0 | 0 | 0 | 0 |
| P1 | 0 | 0 | 0 | 0 | 0 | 0 | 0 | 0 | 0 | 0 |
| P2 | 5 | 5 | 5 | 5 | 5 | 5 | 5 | 5 | 40 | 0※ |
| P3 | 8 | 8 | 8 | 8 | 8 | 8 | 8 | 8 | 64※ | 0※ |
| P4 | 16 | 16 | 16 | 16 | 16 | 16 | 16 | 16 | 128※ | 8※ |
| P5 | 32 | 32 | 32 | 32 | 32 | 32 | 32 | 32 | 256 | 8 |

Fig.5B

| POWER | SECTOR0 | SECTOR1 | SECTOR2 | SECTOR3 | SECTOR4 | SECTOR5 | SECTOR6 | SECTOR7 | ERROR COUNT | NG SECTOR COUNT |
|---|---|---|---|---|---|---|---|---|---|---|
| P0 | 30 | 0 | 0 | 0 | 0 | 0 | 0 | 0 | 30 | 1 |
| P1 | 30 | 0 | 0 | 0 | 0 | 0 | 0 | 0 | 30 | 1 |
| P2 | 35 | 5 | 5 | 5 | 5 | 5 | 5 | 5 | 70※ | 1 |
| P3 | 38 | 8 | 8 | 8 | 8 | 8 | 8 | 8 | 94※ | 1※ |
| P4 | 46 | 16 | 16 | 16 | 16 | 16 | 16 | 16 | 158 | 8※ |
| P5 | 62 | 32 | 32 | 32 | 32 | 32 | 32 | 32 | 286 | 8 |

Fig.5C

| POWER | SECTOR0 | SECTOR1 | SECTOR2 | SECTOR3 | SECTOR4 | SECTOR5 | SECTOR6 | SECTOR7 | ERROR COUNT | NG SECTOR COUNT |
|---|---|---|---|---|---|---|---|---|---|---|
| P0 | 30 | 30 | 0 | 0 | 0 | 0 | 0 | 0 | 60 | 2 |
| P1 | 30 | 30 | 0 | 0 | 0 | 0 | 0 | 0 | 60※ | 2 |
| P2 | 35 | 35 | 5 | 5 | 5 | 5 | 5 | 5 | 100※ | 2 |
| P3 | 38 | 38 | 8 | 8 | 8 | 8 | 8 | 8 | 124 | 2※ |
| P4 | 46 | 46 | 16 | 16 | 16 | 16 | 16 | 16 | 188 | 8※ |
| P5 | 62 | 62 | 32 | 32 | 32 | 32 | 32 | 32 | 316 | 8 |

P0>P1>P2>P3>P4>P5

METHOD AND APPARATUS FOR DETERMINING OPTICAL RECORDING POWER USED FOR RECORDING ONTO AN OPTICAL DISK

This application is based on applications Nos. 2000-81204 and 2001-44942 filed in Japan, the contents of which are incorporated herein by reference.

BACKGROUND OF THE INVENTION

1. Field of the Invention

The present invention relates to an optical disc device and, more specifically, to the device for setting the optimal recording power in the optical disc device that records information by emitting a laser beam to an optical disc recording medium.

2. Description of the Related Art

Optical disc devices of various types have been developed in recent years as a means for recording and reproducing large volumes of data, and various approaches have been taken to achieve ever higher recording densities. Phase change type optical disc devices that use the ability to effect a reversible change between crystalline and non-crystalline (amorphous) phases in the recording medium to record data are exemplary of one such approach.

A phase change type optical disc device records data by forming marks (amorphous parts) and spaces (crystalline parts) between the marks on the optical disc medium. The amorphous marks are formed by setting a semiconductor laser to a peak power level at which crystalline parts are changed to amorphous marks, and the crystalline spaces are formed by setting the semiconductor laser to a bias power level at which amorphous parts are converted to a crystalline state.

Reflectivity is different in marks and spaces. It is therefore possible to use this difference in reflectivity to read the recorded signal during data reproduction (reproduction).

The configuration of a conventional phase change type optical disc device is shown in FIG. 10. As shown in FIG. 10, the optical disk device comprises an optical head 1002, a reproduction section 1003, a reproduction signal quality detection section 1004, an optimal recording power determining section 1005, a recording section 1006, a laser drive circuit 1007, and a recording power setting section 1008.

FIG. 11 shows a track configuration of the optical disc 1001 in the prior art. This optical disc 1001 has recording areas in both a groove-shaped track (groove track 1101) and a track between the grooves (land track 1102). The groove track 1101 and land track 1102 form a continuous spiral by alternating with each other at each revolution of the disc.

When the optical disc 1001 is loaded into an optical disc device, the optical disc device performs trial recording to a predetermined area on the disc 1001, thereby determining an optimal laser power to be emitted for recording data to the disc 1001.

For that, when the optical disc 1001 is loaded into an optical disc device, specific operations are first performed to detect the disc type and information for controlling disc rotation. The optical head 1002 then moves to an area reserved for setting the optimal recording power.

Both the peak power level and bias power level must be determined in a phase change type optical disc device. Determining the peak power level is explained below.

The recording power setting section 1008 first sets initial peak power and bias power levels for the laser drive circuit 1007. The power level set for recording to land tracks and the power level set for recording to groove tracks are equal at this time.

The recording section 1006 then sends a signal for continuously recording a land track for one revolution and a groove track for one revolution from a specified starting point to the laser drive circuit 1007 for recording by the optical head 1002. The output beam from the semiconductor laser that is a component of the optical head 1002 is focused on the optical disc 1001 as a spot to form a mark. The shape of the mark is determined by the waveform of the emitted laser beam.

When recording the land and groove tracks is completed, the semiconductor laser of the optical head 1002 is driven at the reproduction power level to reproduce the signal previously recorded to the land and groove tracks. The reproduction signal 1009, which varies according to the presence or absence of a recording mark on the optical disc 1001, is input to the reproduction section 1003. The reproduction section 1003 then amplifies, waveform-equalizes, and digitizes the reproduction signal 1009, and passes the resulting signal 1010 to the reproduction signal quality detection section 1004.

The reproduction signal quality detection section 1004 detects the signal quality of signal 1010, and inputs the result to optimal recording power determining section 1005.

It should be noted that the reproduction signal quality detection section 1004 detects BER (Byte Error Rate) of the recorded signal when it is reproduced. The BER detected here is the average over the reproduced track. FIG. 12 shows the relationship between peak power and BER.

Peak power is shown on the axis of abscissas and BER on the axis of ordinates in FIG. 12. In general, a lower BER indicates that recording is more accurate, under the same reproduction conditions. An "OK" (good) detection result is therefore output if the BER is less than a specific threshold value, and a "NG" (no good) detection result is output if the BER is greater than or equal to the threshold value.

The optimal recording power determining section 1005 determines the recording power (peek power), for example, according to a procedure indicated by a flowchart shown in FIG. 13.

The optical head moves to a predetermined area provided for setting a laser power emitted onto the optical disc 1001 (S101) and an initial value of the recording power is set (S102). Subsequently, data are recorded onto the power setting area on the disc 1001 with the set recording power and then the recorded data are reproduced (S103). The quality of the reproduced signal is detected by detecting BER from the reproduced signal (S104). Based on the current detection result and the previous detection result, two peak powers are determined with which the quality of the reproduced signal changes "OK" to "NG" or "NG" to "OK" (S104 to S108). After determining those two powers, the optimal power is determined by averaging values of those powers (S109) and adding a predetermined margin to the averaged value (S110).

For example, when the first detection result from the reproduction signal quality detection section 1004 is "NG" the peak power level is set higher than the initial peak power (S108). When the result is "OK", the peak power level is set below the initial peak power (S106). The reset peak power level is then used to record and reproduce the land track and groove track again, and repeat the above evaluation.

Then, when the first detection result from the reproduction signal quality detection section 1004 is "NG" (S104)

and the second result is "OK" (S107), the optimal recording power determining section 1005 takes the average of the previous peak power setting and the subsequent or current peak power setting, adds a predetermined margin, and uses the result as the optimal recording power (S109, S110).

When the first detection result from the reproduction signal quality detection section 1004 is "OK" (S104) and the second result is "NG" (S105), the optimal recording power determining section 1005 takes the average of the previous and current peak power settings, adds a predetermined margin, and uses the result as the optimal recording power (S109, S110).

With the conventional method as described above, the detected BER is the average for the reproduced track. Therefore, reproduction errors increase if there are fingerprints, for example, on the track used for BER detection, causing the BER to be higher than expected. As a result, this causes a power level greater than the actual optimal peak power level to be set as the optimal recording power level.

SUMMARY OF THE INVENTION

The present invention is directed to a solution for the aforementioned problem by providing an optical disc device and a recording power determining method used in the disc device for determining the optimal recording power even when fingerprints are on the track used for the trial recording operation which determines the emission power for recording.

In a first aspect of the invention, a method is provided of determining a recording power which is a laser emission power used for data recording in an optical disc device for recording data to an optical disc. The optical disc having a plurality of tracks each connecting to form a continuous spiral, each track comprising a plurality of sectors. The method comprises setting a plurality of recording power settings, recording specific data to predetermined sectors in predetermined areas with a recording power at each of the set recording power settings, and reproducing the recorded data from each sector to detect, for each sector, a quality of a reproduction signal which is generated by reproducing the recorded data, and determining an amount of the recording power to be used for data recording based on the detection result of the quality of the reproduction signal which is obtained for each sector and for each recording power setting.

The method may further comprise, based on the detection result of the quality of the reproduction signal, obtaining at least one of the plurality of recording power settings with which the number of sectors each having quality of the reproduction signal to meet a predetermined condition are more than or equal to a predetermined number, and determining the amount of the recording power based on the obtained at least one of the recording power settings.

The method may further comprise obtaining a first power setting with which the number of sectors each having quality of the reproduction signal to meet a predetermined condition are more than or equal to the predetermined number and a second power setting with which the number of sectors each having quality of the reproduction signal to meet a predetermined condition are less than the predetermined number, and determining the amount of the recording power based on the first and second recording power settings.

In the method, error rate or jitter of the reproduction signal may be detected as the quality of the reproduction signal.

In the method, a detection result to a sector of which the quality of reproduction meets a predetermined condition which defines a defect of the sector may not be included in the detection results used for determining the amount of the recording power.

In the method, wherein in recording the specific data, data as the specific data which are different from data which has been recorded in a previous time are recorded to each sector.

In the method, the specific data to be recorded may be recorded to each sector after deleting the recorded specific data.

In a second aspect of the invention, an optical disc device is provided for recording data to an optical disc. The optical disc have a plurality of tracks each connecting to form a continuous spiral. Each track comprising a plurality of sectors. The device comprises a setting section for setting a plurality of recording power settings, the recording power being a laser emission power used for data recording, a recording section for recording specific data to predetermined sectors in predetermined areas with a recording power at each of the set recording power settings, and a reproducing section for reproducing the recorded data from each sector to detect, for each sector, a quality of a reproduction signal which is generated by reproducing the recorded data, and a determining section for determining an amount of the recording power to be used for data recording based on the detection result of the quality of the reproduction signal which is obtained for each sector and for each recording power setting.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 4 is a flow chart of a method of determining peek power in the optical disc device according to the invention;

FIGS. 5A to 5C are diagrams which are used for an explanation of a method of determining two boundary recording powers used to determine the optimal recording power;

DESCRIPTION OF THE PREFERRED EMBODIMENTS

The preferred embodiments of an optical disc device according to the present invention are described below with reference to the accompanying figures.

Configuration of Optical Disc Device

Figure 1:
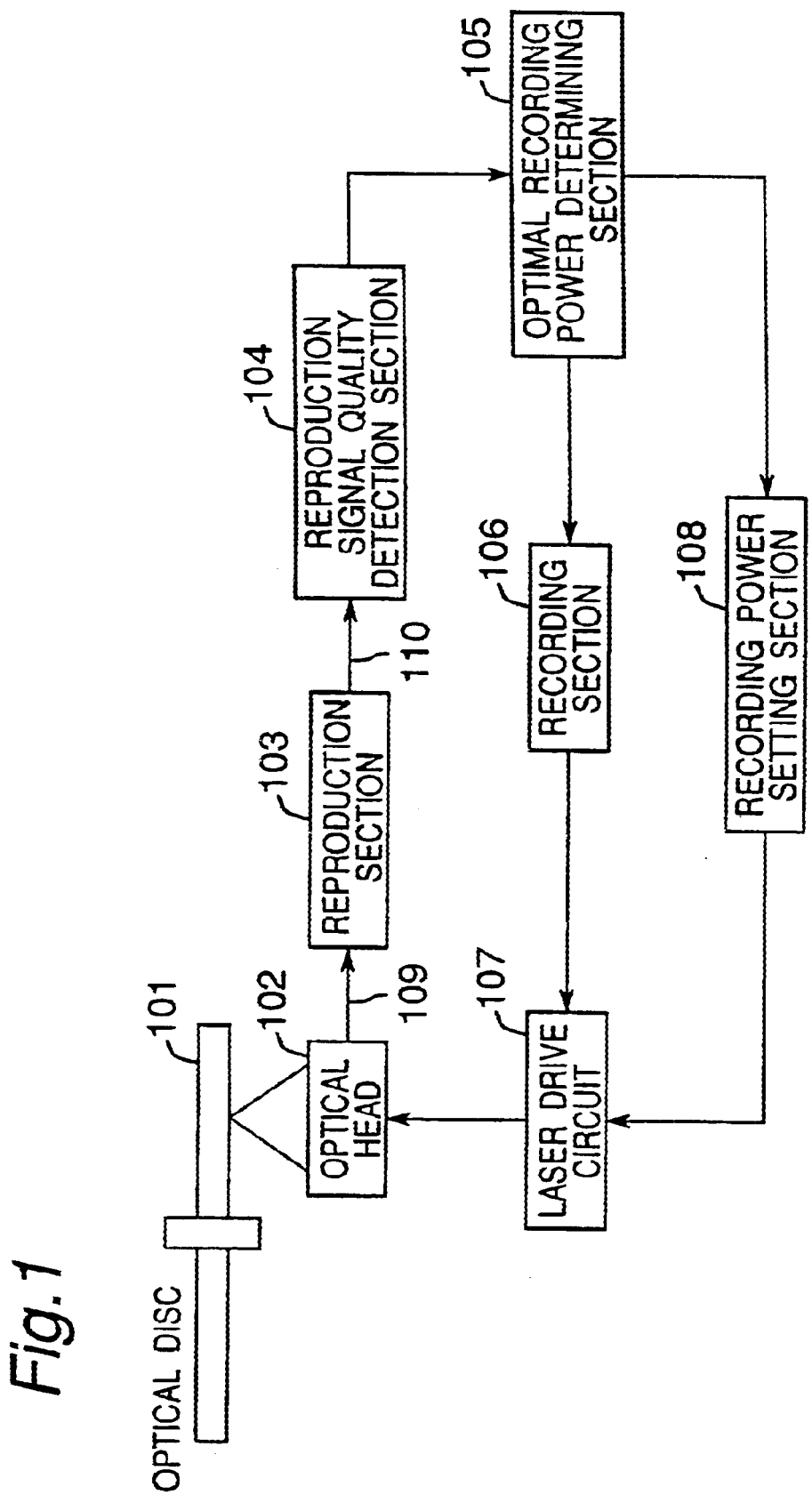
FIG. 1 is a block diagram of an optical disc device according to the present invention.

FIG. 1 shows the configuration of an optical disc device for a phase change type optical disc according to this preferred embodiment of the invention. The optical disc device records/reproduces data to/from the optical disc 101. As shown in FIG. 1, the optical disc device comprises an optical head 102, a reproduction section 103, a reproduction signal quality detection section 104, an optimal recording power determining section 105, a recording section 106, a laser drive circuit 107, and a recording power setting section 108.

Figure 2:
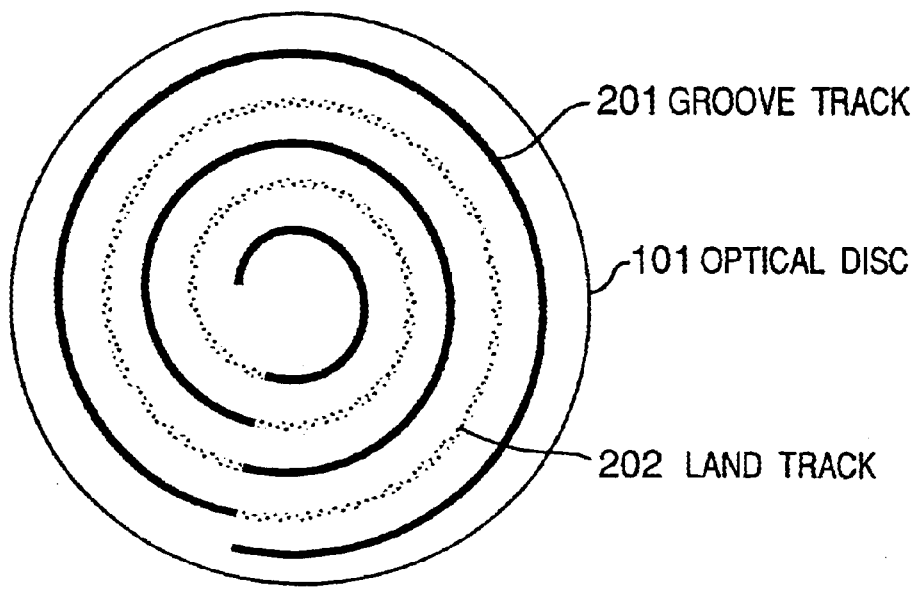
FIG. 2 shows the track configuration of an optical disc used in the optical disc device of the invention.

FIG. 2 shows a track configuration of the optical disc 101 for which the optical disc device records and reproduces data. This optical disc 101 has recording areas in both a groove-shaped track (groove track 201) and a track between the grooves (land track 202). The groove track 201 and land track 202 form a continuous spiral by alternating with each other at each revolution of the disc.

Operation of Optical Disc Device

When the optical disc 101 is newly loaded into an optical disc device, the optical disc device performs trial recording to a predetermined area on the disc 101, thereby determining an optimal laser power to be emitted for recording data to the disc 101.

For that, when the optical disc 101 is loaded into the optical disc device, specific operations are first performed to detect the disc type and information for controlling disc rotation. The optical head 102 then moves to an area (emission power setting area) reserved for setting the optimal recording power.

This emission power setting area is an area at the most inside or most outside circumference of the disc that is not used for recording user data.

The operation for determining amount of the recording power is described next below.

Both the peak power level and bias power level must be determined in a phase change type optical disc device. Determining the peak power is therefore described first below, and determining the bias power is described next.

The recording power setting section 108 first sets initial peak power and bias power levels for the laser drive circuit 107. The recording power setting section 108 can set a variety of settings of recording power. The power level set for recording to land tracks and the power level set for recording to groove tracks are equal at this time.

The recording section 106 then sends a signal for continuously recording a land track for one revolution and a groove track for one revolution from a specified starting point to the laser drive circuit 107 for recording by the optical head 102. The output beam from a semiconductor laser that is a component of the optical head 102 is focused on the optical disc 101 as a spot to form a mark. The shape of the mark is determined by the waveform of the emitted laser beam.

When recording the land and groove tracks is completed, the semiconductor laser of the optical head 102 is driven at the reproduction power level to reproduce the signal previously recorded to the land and groove tracks. A reproduction signal 109 which varies according to the presence or absence of a recording mark on the optical disc 101 is input to the reproduction section 103. The reproduction section 103 then amplifies, waveform-equalizes, and digitizes the reproduction signal 109, and passes the resulting signal 110 to the reproduction signal quality detection section 104.

The reproduction signal quality detection section 104 detects a quality of the signal 110, and inputs the result to the optimal recording power determining section 105. When the number of the reproduced land tracks and the number of the reproduced groove tracks are substantially equal, the reproduction signal quality detection result represents the average result for both the land and groove tracks.

Figure 3:
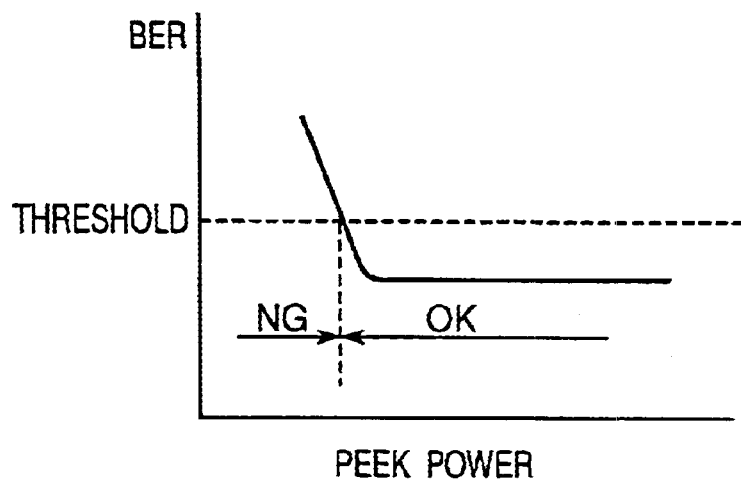
FIG. 3 is a graph of the correlation between peak power and BER.

It should be noted that the reproduction signal quality detection section 104 detects BER (Byte Error Rate) of the recorded signal when it is reproduced. FIG. 3 shows the relationship between peak power and BER. Peak power is shown on the axis of abscissas and BER on the axis of ordinates in FIG. 3. In general, a lower BER indicates that recording is more accurate under the same reproduction conditions. The BER is detected for each sector and compared with a specific threshold value (referred to as "error count threshold value"). If the BER is less than the error count threshold value, the sector is deemed as an "OK" (good) sector. If the BER is greater than or equal to the error count threshold value, the sector is deemed as a "NG" (no good) sector.

Determining Method of Peek Power

The optimal recording power determining section 105 determines the optimal recording power, for example, according to a procedure indicated by the flowchart of FIG. 4.

The optical head 102 moves to the power setting area on the optical disc 101 (S11) and an initial value of the recording power is set (S12). Subsequently, data are recorded onto a plurality of sectors in the power setting area on the disc 101 with the set recording power, and then the recorded data are reproduced from each sector (S13). By determining a quality of the reproduction signal obtained at that time, it is determined whether the recording power at that time is sufficient to record data. The boundary of the recording power sufficient for data recording and the recording power insufficient for data recording is searched during changing the recording power sequentially, thereby obtaining two recording powers beside the boundary (S14–S18). After determining those two recording powers, the optimal recording power is determined by averaging values of those two powers (S19) and adding a predetermined margin to the averaged value (S20).

The determination of whether the recording power is sufficient is done as follows. With one recording power, BER of the reproduction signal is detected for each sector. The NG sector in which BER is greater than or equal to the threshold (error count threshold) is counted. When the number of NG sectors is greater than or equal to a threshold (referred to as "sector count threshold"), the recording power is determined to be insufficient to data recording. When the number of NG sectors is less than the sector count threshold, the power is determined to be sufficient. It is noted in the description described below that the sector count threshold is set to a half of total number of sectors used for trial recording. In the prior art, it is determined whether the recording power is sufficient based on BER over a track. On the contrary, in this embodiment, it is determined as follows. For a plurality of sectors BER is detected for each sector. Each sector is determined whether OK (good) or NG (no good). When the number of NG sectors is greater than or equal to a predetermined number (sector count threshold value), the recording power is determined to be insufficient power, while when the number of NG sectors is less than the predetermined number (sector count threshold value), the recording power is determined to be sufficient power.

For example, when the first detection result from the reproduction signal quality detection section 104 indicates that half or more of the sectors in the power setting area are NG sectors (YES in S14), the peak power level is set higher than the initial peak power (S18). When the result indicates that half or more of those sectors are OK sectors (NO in S14), the peak power level is set below the initial peak power (S16). The reset peak power level is then used to record and reproduce the land track and groove track again (S13).

When the second detection result from the reproduction signal quality detection section 104 indicates that half or more of the sectors area are OK sectors (NO in S14), and the first detection result indicates that half or more of the sectors area are NG sectors (YES in S15), the optimal recording power determining section 105 obtains the average of the first and second peak power settings, adds thereto a specific margin, and uses the result as the optimal recording power setting (S19, S20).

When the second detection result from the reproduction signal quality detection section 104 indicates that half or more of the sectors are NG sectors (YES in S14), and the first detection result indicates that half or more of the sectors are OK sectors (YES in S17), the optimal recording power determining section 105 obtains the average of the first and second peak power settings, adds thereto a specific margin, and uses the result as the optimal recording power setting (S19, S20).

When the second detection result from the reproduction signal quality detection section 104 indicates that half or more of the sectors are OK sectors (NO in S14), and the first detection result indicates that half or more of the sectors are OK sectors (NO in S15), peak power is reset to a level below the peak power level used the second time (S16) Recording, reproduction, and signal quality detection are then repeated at this new peak power setting (S13). When half or more of the sectors are NG sectors in the third result (YES in S14), the optimal recording power determining section 105 obtains the average of the second and third peak power settings, adds thereto a specific margin, and uses the result as the optimal recording power setting (S19, S20).

With reference to FIGS. 5A to 5C, a method of obtaining the boundary recording powers used to set the optimal recording power is described.

FIGS. 5A to 5C show tables each indicating the results of BER measurements after recording to eight sectors while varying the recording power level. FIG. 5A shows the results when there are no fingerprints on the surface of the all area of sectors, FIG. 5B shows the results when there is a fingerprint on area of sector 0, and FIG. 5C shows the results when there is a fingerprint in sector 0 and sector1. Here, a threshold to the whole track in the prior art is set to 80. The error count threshold to each sector is set to a value (10) which is obtained by dividing the threshold (80) to the whole track by number (8) of sectors to be reproduced.

The columns on the right end of each table shows the number of errors (BER value) and number of NG sectors. The number of errors is the total number of errors at each power level. The number of NG sectors represents count of the NG sectors detected with the error count threshold of 10. A BER detection method according to the related art uses the total number of errors detected at each power level. Therefore the number of errors increases as the power setting decreases as P0, P1, P2 . . . etc. In the example shown in the table of FIG. 5A, according to the conventional manner (for example, the error count threshold is set to 80), power levels P3 and P4 (indicated by "*" in the table) are detected as values before and after the threshold (80). The values of P3 and P4 are used to determine the optimal recording power. On the contrary, in this embodiment, the detected BER is compared with the error count threshold value (10) for each sector. The values of P3 and P4 (indicated by "*") are detected as powers before and after the sector count threshold (4=8/2), and used for determining the optimal recording power.

As shown in FIG. 5A, the same power level is set by the method of the prior art and the method of the invention. This is because the quotient of the error count value (80) of the prior art divided by the sector count (8) is set to the error count threshold value (10) for each sector in this preferred embodiment of the invention, and signal quality is measured at the power setting resulting in half (4) of all sectors being NG sectors. More specifically, this is because near the desirably detected recording level the number of errors in each sector is approximately equal to the error count threshold value of the prior art divided by the number of sectors, and approximately half of all sectors exceed the error count threshold value.

In FIG. 5B showing the results obtained when a fingerprint is in sector0, the error count increases because of sector0. The power levels P2 and P3 as powers before and after the threshold (80) are detected by the prior art, and recording power is thus set higher than when no fingerprints are present (in case of FIG. 5A). The method of the present invention, however, sets the same recording power as when there are no fingerprints.

Furthermore, in case of FIG. 5C where there are fingerprints in sector0 and sector1, the error count increases further by sector0 and sector1. The power levels P1 and P2 as levels before and after the threshold (80) are detected in a method of the prior art. Recording power is thus set even higher than when fingerprints are found in only sector0 (in case of FIG. 5B). The method of the present invention, however, sets the same recording power as that obtained when there are no fingerprints (in case of FIG. 5A).

According to the prior art, since error count over a track is considered, the recording power setting increases as the number of errors increases due to a fingerprint. Therefore difference between the recording power set by the prior art and the recording power set properly becomes larger.

The method of the present invention, on the other hand, determines whether the sector is OK or NG for each sector. For example, in the example shown in FIG. 5B, the recording power at which three of the seven sectors, not including sector0, are determined to be NG sectors based on the recording characteristics is obtained. In FIG. 5C, the recording power at which two of the six sectors, not including sector0 and sector1, are determined to be NG sectors based on the recording characteristics is obtained. In effect, therefore, the sectors with fingerprints are removed, and the effect of fingerprints on the recording medium can be restricted. It should be noted that while the present invention is described recording and reproducing eight sectors to determine the recording power as shown in FIGS. 5A to 5C, the effect of fingerprints becomes smaller as the number of sectors increases. For example, with sixteen or more sectors, fingerprints have substantially no effect on the recording power setting.

As described above, upon the trial recording to plural sectors before recording user data, the reproduction signal quality is detected for each sector. When error count (BER) indicative of the reproduction signal quality is less than or equal to the threshold value, the sector is determined to be OK sector. When otherwise, the sector is determined to be NG sector. Then the boundary powers are detected with which the number of NG sectors changes more than or equal to a predetermined value into less than the predetermined value, or changes less than the predetermined value into more than or equal to the predetermined value. The recording power which is used for actual data recording is determined based on the boundary powers. Thus, it is possible to determine the optimal recording power even when fingerprints or blots are added on the track area for trial recording.

A sector of which condition is relatively bad compared with other sectors based on the detection result of error count (BER) for each sector may be considered not appropriate to be used for determining the recording power. Therefore, such a sector may be excluded from count of NG sectors.

For example, when there are sectors which have the error count more than the minimum error count among sectors by a specified number (for example, 30), those sector may be excluded from the NG sector count. In this case, the sector count threshold is set to a value obtained by subtracting the number of excluded sectors from the number of all reproduced sectors, and dividing the result by 2. Sectors which have relatively more error counts are considered inappropriate to be used for determining the recording power. Therefore, excluding those sectors allows the obtained recording power to be more accurate.

In FIG. 5C, for example, sector0 and sector1 at power level P0 have 30 more errors than the other sectors. These two sectors are therefore excluded or removed from the NG sector count. The sector count threshold value is set to 3 obtained by subtracting 2 sectors from 8 sectors and then dividing the result (6 sectors) by 2. In this way as with the example shown in FIG. 5A, the recording powers P3 and P4 are detected as the boundary powers used for determining the optimal recording power.

When the BER is detected for each sector while changing the recording power, if there is a sector providing a maximum number of errors a specified number of times (twice, for example), that sect or may be removed from the NG sector count. The sector count threshold is set to a value obtained by subtracting the number of removed sectors from the reproduced sectors and then dividing the result by 2. Thus, more accurate recording power can be obtained.

In FIG. 5B, for example, sector0 has more errors than the other sectors at power levels P0 and P1. That sector is therefore removed from the NG sector count, and then the sector count threshold value is determined to 3.5 (=(8 sectors−1 sector)/2). As with the example shown in FIG. 5A, the powers P3 and P4 are again detected as the boundary powers used for determining the optimal recording power.

When the BER is detected for each sector while changing the recording power, if there is a sector that is below a particular rank (when the sectors are ranked in order from the sector with the fewest errors to the sector with the most errors) a specified number of times (twice, for example), that sector may be removed from the NG sector count.

In FIG. 5C, for example, sector0 and sector1 at power levels P0 and P1 are ranked lowest based on the error count. These two sectors are therefore removed from the NG sector count, and then the sector count threshold value is determined to be 3 ((8 sectors−2 sectors)/2). As with the example shown in FIG. 5A, the powers P3 and P4 are again detected as the boundary powers used for determining the optimal recording power.

It should be noted that while the sector count threshold value is half the number of reproduced sectors in the present embodiment, other methods can be used to determine the sector count threshold value insofar as the threshold value makes it possible to eliminate the effects of fingerprints and similar error-producing factors and determine the correct recording power setting.

Furthermore, the error count threshold value for each sector is set to be the quotient of the total error count divided by a number of reproduced sectors in the present embodiment, but other methods can be used to determine the error count threshold value insofar as the threshold value makes it possible to eliminate the effects of fingerprints and similar error-producing factors and determine the correct recording power setting.

Determining Method of Bias Power

A method for determining the optimal bias power setting is described next.

It should be noted that compared with the peak power level, the bias power has a smaller margin within which user data can be recorded. For example, while the peak power ranges from 9 mW to 15 mW and the power margin is thus 6 mW, the bias power ranges from 3 mW to 6 mW and the power margin is thus only 3 mW.

Therefore, to determine the optimal bias power setting, a preferred embodiment of the present invention first determines a lower and an upper limit of bias power levels that can be used to record user data, and then calculates an optimal value between the lower and upper limits.

First, the recording power setting section 108 sets, for the laser drive circuit 107, initial peak power and bias power levels used to determine the lower limit of the bias power. The power level set for recording to land tracks and the power level set for recording to groove tracks are equal at this time.

The recording section 106 then sends a signal for continuously recording a land track for one revolution and a groove track for one revolution from a specified starting point to the laser drive circuit 107 for recording by the optical head 102. The output beam from the semiconductor laser that is a component of the optical head 102 is focused on the optical disc 101 as a spot to form a mark. The shape of the mark is determined by the waveform of the emitted laser beam.

When recording is completed, the semiconductor laser of the optical head 102 is driven at the reproduction power level to reproduce the signal previously recorded to the land and groove tracks. The reproduction signal 109 which varies according to the presence or absence of a recording mark on the optical disc 101, is input to the reproduction section 103. The reproduction section 103 then amplifies, waveform-equalizes, and digitizes the reproduction signal 109, and passes the resulting signal 110 to the reproduction signal quality detection section 104.

Figure 6:
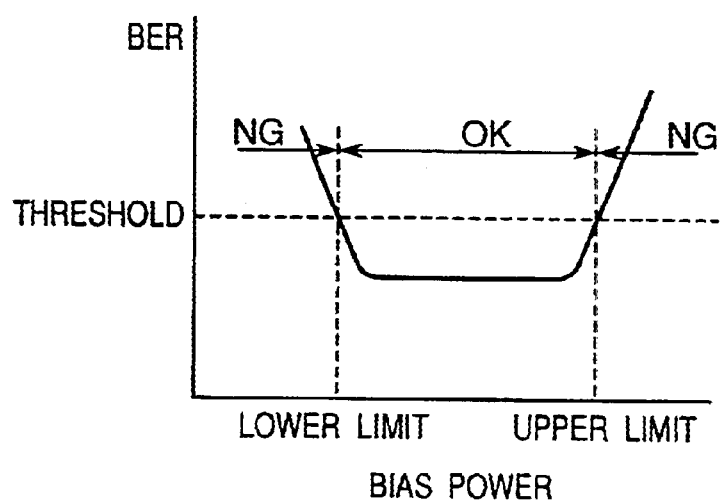
FIG. 6 is a graph of the correlation between bias power and BER.

The reproduction signal quality detection section 104 detects BER (Byte Error Rate) of the recorded signal when it is reproduced. FIG. 6 shows the relationship between bias power and BER of a sector.

Bias power is shown on the axis of abscissas and BER on the axis of ordinates in FIG. 6. In general, a lower BER indicates that recording is more accurate, assuming equal reproduction conditions. The BER is detected for each sector and compared with a specific threshold value (error count threshold value). If the BER is less than the threshold value, the sector is deemed to be an "OK" sector. If the BER is greater than or equal to the threshold value, the sector is deemed to be an "NG" sector.

Figure 7:
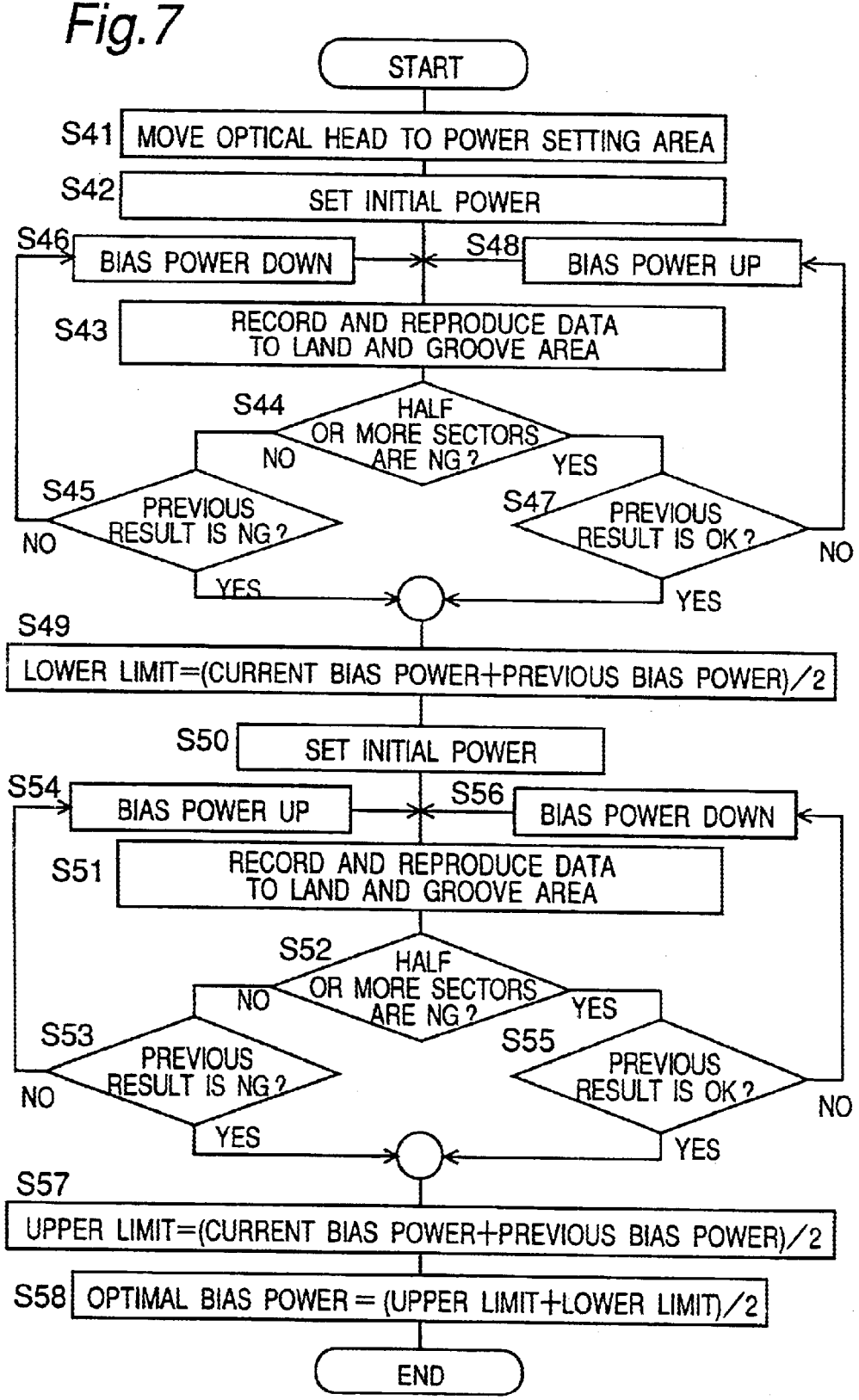
FIG. 7 is a flow chart of a method of determining bias power in the optical disc device according to the invention.

The optimal recording power determining section 105 determines the optimal bias power, for example, according to a procedure indicated by a flowchart of FIG. 7.

In the flowchart of FIG. 7, the lower limit of bias power is determined by steps S41 to S49, the upper limit of bias power is determined by steps S50 to S57. In those steps, the procedure to determine the lower limit or the upper limit of power is basically the same as the procedure of the flowchart of FIG. 4.

For example, at determining the lower limit of bias power level, if the first detection result from the reproduction signal quality detection section 104 indicates that half or more of the sectors are NG sectors (YES in S44), the optimal recording power determining section 105 resets the bias power to a level greater than the initial bias power setting (S48). If half or more of the sectors are OK sectors (NO in S44), the optimal recording power determining section 105 resets the bias power to a level lower than the initial bias power level setting (S46). Recording and reproducing to the land and groove tracks are then repeated similarly with the reset bias power setting (S43).

If the second detection result from the reproduction signal quality detection section 104 indicates that half or more of the sectors are OK sectors (NO in S44) and the first detection result indicates that half or more of the sectors are NG sectors (YES in S45), the optimal recording power determining section 105 sets the lower limit of bias power to the average of the current bias power setting and the previous bias power setting (S49).

If the second detection result from the reproduction signal quality detection section 104 indicates that half or more of the sectors are NG sectors (YES in S44), and the first detection result indicates that half or more of the sectors are OK sectors (YES in s47), the optimal recording power determining section 105 sets the lower limit of bias power to the average of the current bias power setting and the previous bias power setting (S49).

If the second detection result from the reproduction signal quality detection section 104 indicates that half or more of the sectors are OK sectors (NO in S44), and the first detection result is that half or more of the sectors are OK sectors (NO in S45), the bias power is reset to a level below the bias power used the second time (S46). Recording, reproduction, and signal quality detection are then repeated at this new bias power setting (S43). If half or more of the sectors are NG sectors at this third time (YES in S44), the optimal recording power determining section 105 sets the lower limit of bias power to the average of the second and third bias power settings (S49).

The upper limit of bias power is obtained in the same way as the lower limit of bias power (S50 to S57). The optimal recording power determining section 105 then sets the optimal bias power to the average of the lower limit of and upper limit of bias power settings, for example (S58).

A method of determining the bias power described above also comprises performing the trial recording to plural sectors; detecting the reproduction signal quality from the trial recorded sectors; finding the boundary recording power around which a specific number or more of sectors change from NG sectors to OK sectors, or from OK sectors to NG sectors, the OK sectors being sectors in each of which the error count is less than a specific threshold value, the NG sectors being sectors in each of which the error count is greater than or equal to the specific threshold value; and determining the recording power which is used for actual data recording based on this boundary recording power level. It is therefore possible to set an optimal recording power even when there are fingerprints or scratches on the tracks used for test recording.

When the lower and upper limits of bias power levels are determined, initial power of determining the upper limit of the power is set larger than one of determining the lower limit of power. That is, difference is made between those initial powers and each initial power is set to around a limit of the respective power. Thus it becomes possible to determine the optimal recording power for shorter time.

It should also be noted that while the optimal bias power is set to the average of the lower limit and the upper limit, the optimal bias power can be set to a particular internal ratio, such as 2:1, between the lower limit and upper limit of the bias power. This is beneficial when the disc is warped, for example, resulting in the effective recording power relative to the set optimal recording power being extremely low on an area where actual user data is recorded. Note that the margin on the low power side is increased by setting the optimal power to the value obtained by internally dividing the lower limit and upper limit of values 2:1.

Possible Variations

In this embodiment, the reproduction signal quality detection section 104 detects the BER (byte error rate) when reproducing a just recorded signal. At that time, errors occurring in continuous strings of more than a specified number of errors may not be counted as errors. Thus, errors occurring as a result of a scratch or otherwise locally defective recording area can be eliminated, and the optimal power can be set more accurately.

Furthermore, in this embodiment, the reproduction signal quality detection section 104 detects the BER (byte error rate) when reproducing a just recorded signal. However, other than the BER, bit error rate or jitter can be used to detect reproduction signal quality.

Figure 8:
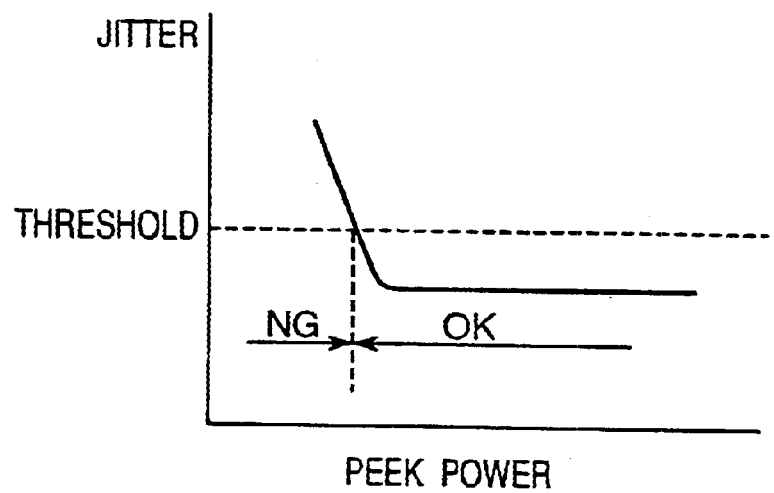
FIG. 8 is a graph of the correlation between peak power and jitter.
Figure 9:
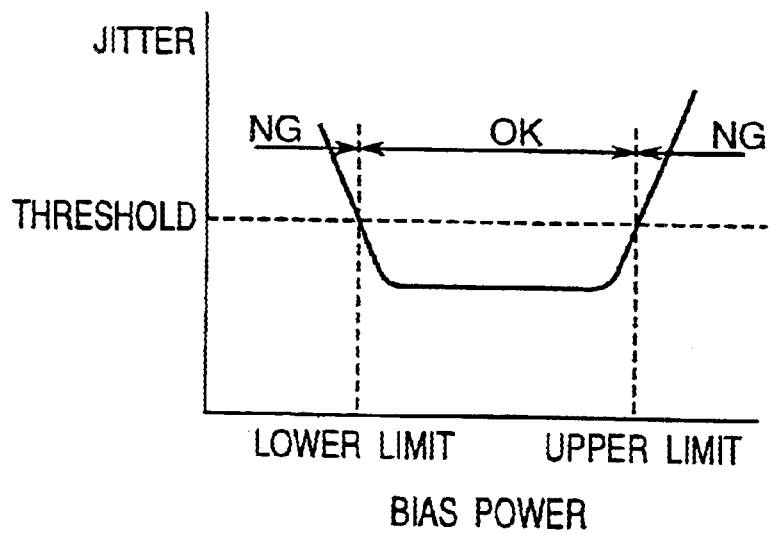
FIG. 9 is a graph of the correlation between bias power and jitter.
Figure 10:
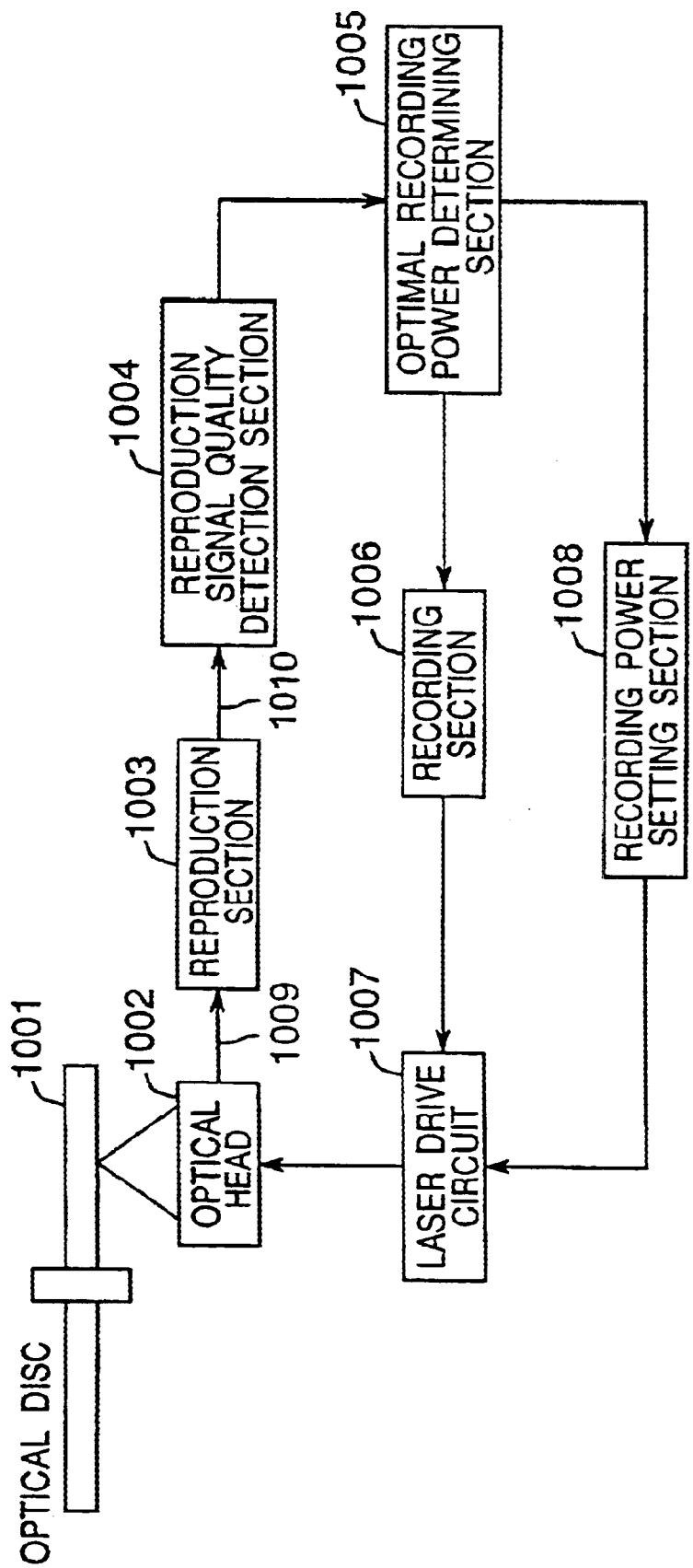
FIG. 10 is a block diagram of an optical disc device according to the prior art.
Figure 11:
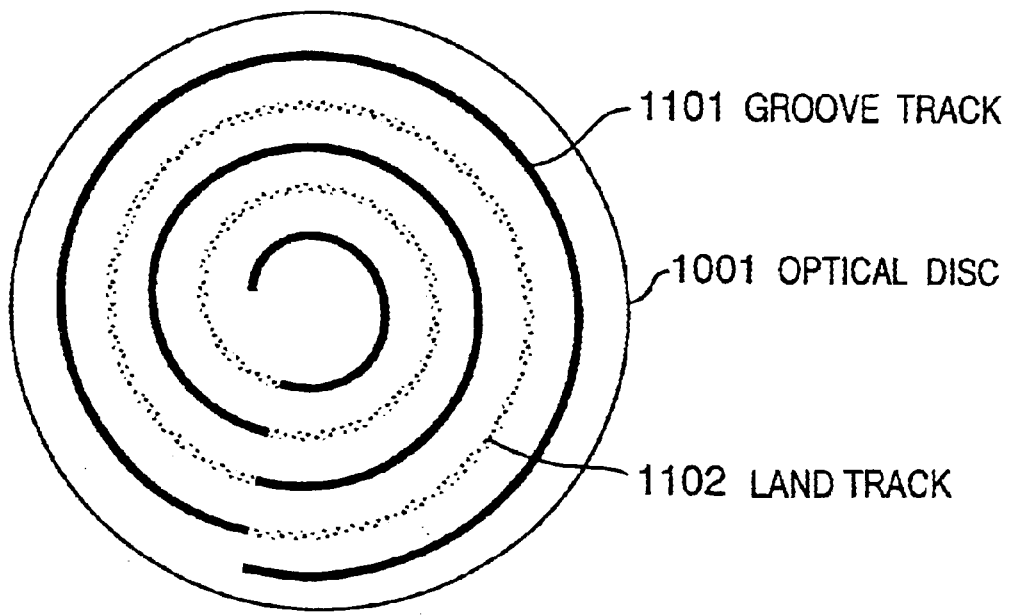
FIG. 11 shows the track configuration of an optical disc.
Figure 12:
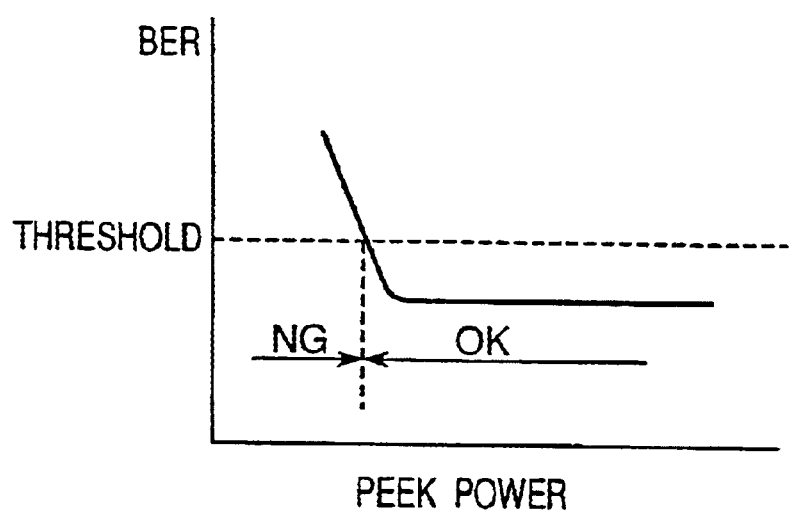
FIG. 12 is a graph of the correlation between peak power and BER.
Figure 13:
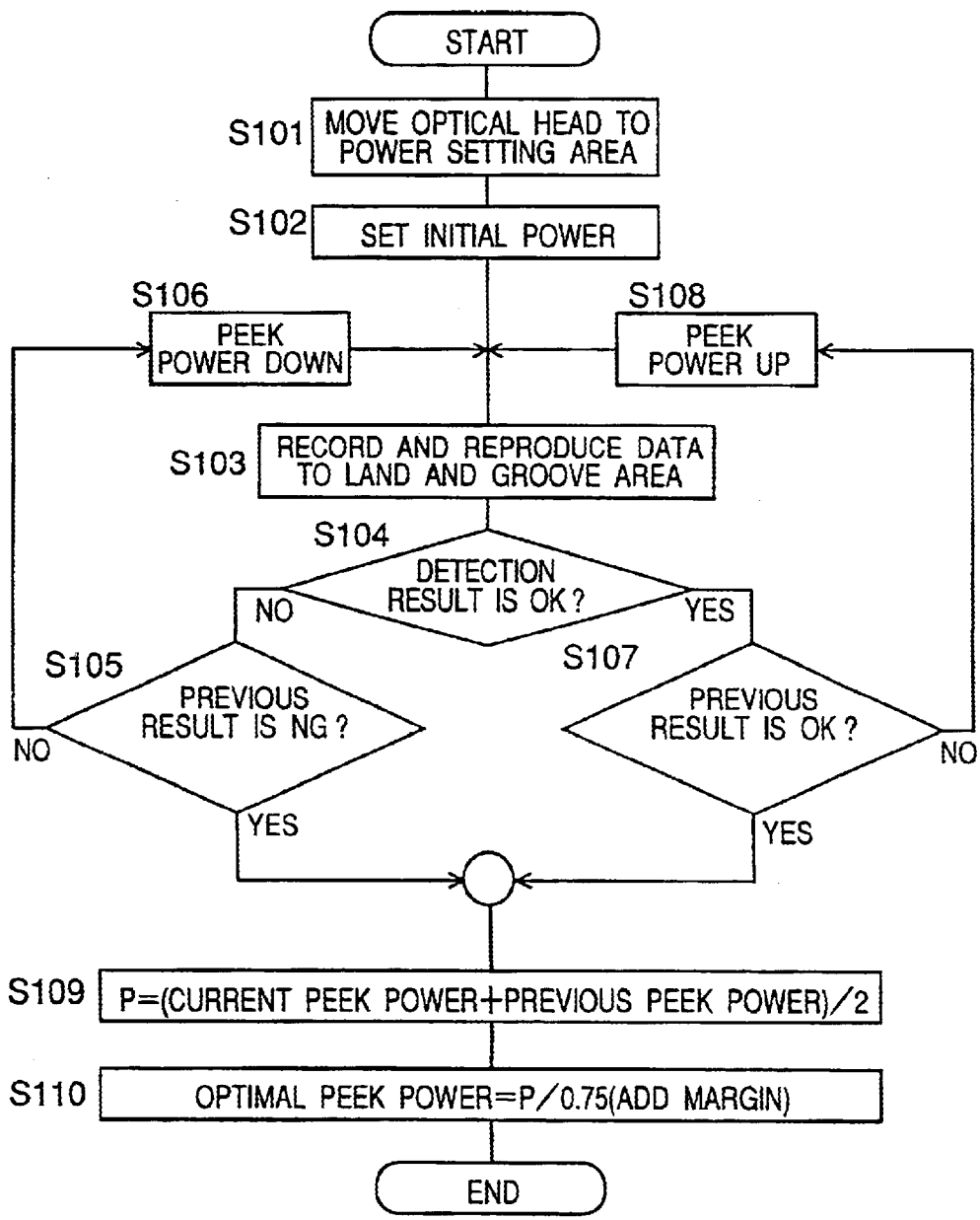
FIG. 13 is a flow chart of a method of determining recording power in the optical disc device according to the prior art.

A method that detects jitter, for example, is described below. FIG. 8 shows the relationship between peak power and jitter. Peak power is shown on the axis of abscissas, and jitter on the axis of ordinates, in FIG. 8. The relationship between bias power and jitter is shown in FIG. 9. Bias power is on the axis of abscissas, and jitter on the axis of ordinates, in FIG. 9.

Jitter is the time difference between the reproduced signal and original signal, and is caused by a drop in the reproduction signal amplitude resulting from insufficient laser power. Jitter drops when reproduction signal amplitude rises, and is substantially constant when the reproduction signal amplitude is saturated. That is, under the same reproduction conditions, lower jitter generally allows recording to be more accurate. When a sector in which number of jitters is less than a specific threshold value is detected, the sector is taken as an OK sector, and when a sector in which number of jitters is greater than or equal to the threshold value is detected, the sector is taken as an NG sector.

It should be further obvious that while the previous embodiment is described using one complete land track revolution and one complete groove track revolution as the continuous recording and continuous reproduction area, this can be accomplished in block units in an optical disc device that records in block units.

It should be further obvious that while the previous embodiment is described using one complete land track revolution and one complete groove track revolution as the continuous recording and continuous reproduction area, this can be accomplished in sector units in an optical disc device that records in sector units.

It should be further obvious that while the previous embodiment is described using one complete land track revolution and one complete groove track revolution as the continuous recording and continuous reproduction area, recording and reproduction from two or more land track revolutions and two or more groove track revolutions is also possible. Recording and reproducing from two or more track revolutions can absorb track variations and make it possible to more accurately determine the optimal recording power.

When recording in block units, it is likewise possible to record and reproduce two or more land track blocks and two or more groove track blocks. Recording and reproducing from two or more blocks per track can absorb block variations and make it possible to more accurately determine the optimal recording power.

Furthermore, the results from the worst block detected by the reproduction signal quality detection section 104 may be discarded when recording and reproducing from two or more blocks. Thus, blocks where a scratch or other recording defect are present can be eliminated, and optimal recording power can be more accurately determined.

It should be noted that a signal pattern different from that used for previous detecting of reproduction signal quality can be recorded before recording the signal for detecting reproduction signal. Recording a different signal pattern reduces any residual signal components left from a previously recorded test signal so that, for example, a previously recorded signal will not be reproduced in error even if the signal is not recorded sufficiently by recording with a lower power level than a level of previous recording. The recording power can therefore be more accurately optimized.

Furthermore, it is also possible to record to the continuous recording area at the bias power level only before continuous recording for reproduction signal quality detection. Recording at only the bias power reduces any residual signal components left from a previously recorded test signal so that, for example, a previously recorded signal will not be reproduced in error even if the signal is recorded at a lower power level than previously used and the test signal is not sufficiently recorded. The recording power can therefore be more accurately optimized.

Furthermore, the reproduction signal quality detection section 104 of the preferred embodiment of the invention evaluates signal quality in each sector without distinguishing between land tracks and groove tracks. It is however possible to distinguish between land tracks and groove tracks when evaluating signal quality in each sector. When the recording characteristics of the land and groove tracks differ, distinguishing between the land tracks and groove tracks makes it possible to set an optimal recording power level suitable for the characteristics.

Furthermore, by separately reproducing land tracks and groove tracks, it is no longer necessary to reproduce the one track after the recording power has been determined for the other, and the time required to set the optimal recording power levels can thus be reduced.

It will also be obvious that while the recording power setting means 108 sets the recording power without distinguishing between land and groove tracks in the preferred embodiments of the invention, recording power can be set separately for land tracks and groove tracks. When the recording characteristics of the land and groove tracks are different, a recording power appropriate to each is set as the initial recording power. This reduces the number of times the recording power must be set to determine the optimal recording power, eliminates the need to record one track when the recording power has been determined for the other track, thus reduces the time needed to set the optimal recording power, and reduces deterioration caused by repeated recording.

It will also be obvious that while the present embodiments of the present invention have been described using an optical disc capable of recording to both land and groove tracks, the invention can also be applied to optical discs that record to only land tracks or only groove tracks.

As described above, the optical disc device according to the embodiment of the present invention performs, prior to recording user data, the trial recording on plural sectors to detect the reproduction signal quality from each recorded sector. A sector in which the error count is less than a threshold value is considered an OK sector, a sector in which the error count is greater than or equal to the threshold value is considered an NG sector. Then, found are the recording powers around which the number of NG sectors changes from more than or equal to a threshold to less than the threshold, or from less than the threshold to more than or equal to the threshold. The found recording power levels are then used to set the recording power used for actual data recording. Thus, the optimal recording power can be determined even when there are fingerprints or scratches on the tracks which are used for the trial recording.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A method of determining a recording power which is a laser emission power used for recording data to an optical disk by an optical device, wherein the optical disk has a plurality of tracks each connected to form a continuous spiral and each track has a plurality of sectors, said method comprising:

recording specific data repeatedly for a plurality of cycles, the specific data being written to predetermined ones of a plurality of sectors during each of the plurality of cycles;

varying a recording power used to record the specific data after each of the plurality of cycles;

reproducing the specific data recorded to each of the predetermined ones of the plurality of sectors;

detecting, for each of the predetermined ones of the plurality of sectors, a quality of a reproduction signal which is obtained by reproducing the recorded specific data;

counting, in each of the plurality of cycles, selected sectors that produce the reproduction signal having a quality which satisfies a predetermined condition; and determining a level of a data recording power to be used for data recording according to the recording power used in a cycle among the plurality of cycles and a number of selected sectors in each of the plurality of cycles.

2. The method according to claim 1, wherein a first power is obtained with which the number of selected sectors each having the quality of the reproduction signal satisfying the predetermined condition are at least equal to the predetermined number and a second power is obtained with which the number of selected sectors each having the quality of the reproduction signal satisfying the predetermined condition are less than the predetermined number, and the level of the recording power is determined based on the first and second recording powers.

3. The method according to claim 1, wherein an error rate or jitter of the reproduction signal is detected as the quality of the reproduction signal.

4. The method according to claim 1, wherein a detection result of a sector in which the quality of the reproduction satisfies the predetermined condition which defines a defect of the sector is not counted.

5. The method according to claim 1, wherein in said recording the specific data, data as the specific data which are different from data which has been recorded at a previous time are recorded to each sector.

6. The method according to claim 1, wherein the specific data to be recorded are recorded to each sector after deleting previously recorded specific data.

7. The method according to claim 1, wherein the predetermined ones of the plurality of sectors having specific data recorded thereto during said recording are located in a predetermined emission power setting area on the optical disk.

8. The method according to claim 7, wherein the predetermined emission power setting area is an area located at one of a most inside and a most outside circumference of the disc that is not used for recording user data.

9. A method according to claim 1, wherein the level of the data recording power to be data recording is determined according to an average of the recording power used in the cycle among the plurality of cycles and another recording power used in a cycle among the plurality of cycles, and a number of selected sectors in each of the plurality of cycles, wherein a predetermined margin is added to the averaged recording power.

10. A device for recording data to an optical disk, wherein the optical disk has a plurality of tracks each connected to form a continuous spiral and each track has a plurality of sectors, said device comprising:

a recording section operable to record specific data repeatedly for a plurality of cycle, the specific data being written to predetermined ones of a plurality of sectors during each of the plurality of cycles;

a varying section operable to vary a recording power used to record the specific data after each of the plurality of cycles;

a reproducing section operable to reproduce the specific data recorded to each of the predetermined ones of the plurality of sectors;

a detecting section operable to detect, for each of the predetermined ones of the plurality of sectors, a quality of a reproduction signal which is obtained by reproducing the recorded specific data; a counting section operable to count, in each of the plurality of cycles, selected sectors that produce the reproduction signal having a quality which satisfies a predetermined condition; and a determining section operable to determine a level of a data recording power to be used for data recording according to the recording power used in a cycle among the plurality of cycles and a number of selected sectors in each of the plurality of cycles.

11. The device according to claim 10, wherein said determining section is operable to determine a first power with which the number of selected sectors each having the quality of the reproduction signal satisfying the predetermined condition are at least equal to the predetermined number and a second power with which the number of selected sectors each having the quality of the reproduction signal satisfying the predetermined condition are less than the predetermined number, and then determine the level of the recording power based on the first and second recording powers.

12. The device according to claim 10, wherein said detecting section is operable to detect an error rate or jitter of the reproduction signal as the quality of the reproduction signal.

13. The device according to claim 10, wherein said counting section is operable to exclude a detection result of a sector in which the quality of the reproduction satisfies the predetermined condition which defines a defect of the sector from detection results used for counting.

14. The device according to claim 10, wherein said recording section, in recording the specific data, is operable to record to each sector data as the specific data which are different from data which has been recorded at a previous time.

15. The device according to claim 10, wherein said recording section is operable to record, to each sector, specific data to be recorded after deleting previously recorded specific data.

16. The device according to claim 10, wherein the predetermined ones of the plurality of sectors having specific data recorded thereto by said recording section are located in a predetermined emission power setting area on the optical disk.

17. The device according to claim 16, wherein the predetermined emission power setting area is an area located at one of a most inside and a most outside circumference of the disc that is not used for recording user data.

18. A device according to claim 10, wherein said determining section is operable to determine the level of the data recording power to be used for the data recording according to an average of the recording power used in the cycle among the plurality of cycles and another recording power used in a cycle among the plurality of cycles, and a number of selected sectors in each of the plurality of cycles, wherein a predetermined margin is added to the averaged recording power.

* * * * *